United States Patent
Jones

(10) Patent No.: US 8,465,832 B2
(45) Date of Patent: *Jun. 18, 2013

(54) COMPOSITE LAMINATED ARTICLE AND MANUFACTURE THEREOF

(75) Inventor: Daniel Thomas Jones, Isle of Wight (GB)

(73) Assignee: Gurit (UK) Ltd., Newport, Isle of Wight (GB)

( * ) Notice: Subject to any disclaimer, the term of this patent is extended or adjusted under 35 U.S.C. 154(b) by 159 days.

This patent is subject to a terminal disclaimer.

(21) Appl. No.: 12/681,570

(22) PCT Filed: Oct. 6, 2008

(86) PCT No.: PCT/GB2008/003361
§ 371 (c)(1),
(2), (4) Date: Jun. 22, 2010

(87) PCT Pub. No.: WO2009/047483
PCT Pub. Date: Apr. 16, 2009

(65) Prior Publication Data
US 2010/0261000 A1 Oct. 14, 2010

(30) Foreign Application Priority Data
Oct. 8, 2007 (GB) .................................. 0719618.1

(51) Int. Cl.
*B32B 9/04* (2006.01)
*C09J 5/06* (2006.01)

(52) U.S. Cl.
USPC ....... 428/318.4; 428/314.8; 521/56; 156/305; 156/60; 156/330

(58) Field of Classification Search
USPC ................. 428/314.8, 318.4; 521/56; 156/60, 156/305, 330
See application file for complete search history.

(56) References Cited

U.S. PATENT DOCUMENTS

| 4,032,609 A | 6/1977 | Smith |
| 4,532,263 A | 7/1985 | Krutchen et al. |

(Continued)

FOREIGN PATENT DOCUMENTS

| EP | 0442102 A1 | 12/1990 |
| EP | 0408901 A | 1/1991 |

(Continued)

OTHER PUBLICATIONS

Dec. 18, 2008 International Search Report and Written Opinion in PCT/GB2008/003382.

(Continued)

*Primary Examiner* — Hai Vo
(74) *Attorney, Agent, or Firm* — Novak Druce Connolly Bove & Quigg LLP

(57) ABSTRACT

Composite laminated article having: a first layer of a fiber-reinforced resin, a second layer of a closed cell foam of a thermoplastic material, and a third layer of a fiber-reinforced resin, the resin of the first and third layers respectively adhering a surface of the first and third layers to a respective surface of the second layer to form a sandwich construction of the first, second and third layers, wherein the closed cell foam comprises a plurality of expanded beads mutually welded together, each bead comprising a plurality of closed cells, wherein in each bead the closed cell foam has an average cell size of from 15 to 75 microns, at least 50% of the beads comprise first beads having a uniform cell size in which the maximum cell size is 100 microns and at most 50% of the beads comprise second beads having a non-uniform cell size in which the majority of cells have a maximum cell size of 100 microns and a minority of cells have a maximum cell size from more than 100 microns to up to 660 microns.

22 Claims, 6 Drawing Sheets

U.S. PATENT DOCUMENTS

| | | | |
|---|---|---|---|
| 4,752,625 A | | 6/1988 | Wu et al. |
| 5,049,328 A | | 9/1991 | Meyer |
| 5,064,869 A | * | 11/1991 | Bopp et al. ............... 521/60 |
| 5,271,886 A | | 12/1993 | Collom et al. |
| 5,374,383 A | | 12/1994 | Brambach |
| 8,012,301 B2 | * | 9/2011 | Schiffmann et al. ....... 156/307.1 |
| 2005/0027025 A1 | | 2/2005 | Erb et al. |
| 2007/0020447 A1 | | 1/2007 | Yamaguchi et al. |
| 2010/0261000 A1 | * | 10/2010 | Jones ...................... 428/313.5 |
| 2010/0291370 A1 | * | 11/2010 | Jones ...................... 428/314.8 |

FOREIGN PATENT DOCUMENTS

| | | |
|---|---|---|
| EP | 0453784 A2 | 10/1991 |
| EP | 0623491 A1 | 11/1994 |
| EP | 1859927 A2 | 11/2007 |
| JP | 090104783 A | 4/1990 |
| JP | 040345635 A | 12/1992 |
| JP | 050262909 A | 10/1993 |
| JP | 070040484 A | 2/1995 |
| JP | 100273551 A | 10/1998 |
| JP | 090131821 A | 12/2002 |
| JP | 2007144919 A | 6/2007 |
| WO | WO 02/09934 A1 | 2/2002 |
| WO | WO 2009/047487 A1 | 4/2009 |

OTHER PUBLICATIONS

Dec. 18, 2008 International Search Report and Written Opinion in PCT/GB2008/003361.

Mar. 25, 2008 GB Search Report and Examination Report in GB 0719619.9.

Mar. 25, 2008 GB Search Report and Examination Report in GB 0719618.1.

* cited by examiner

Weld fault between beads (highlighted)     Larger cell within bead (highlighted)     Fusion weld line between beads

COMPOSITE LAMINATED ARTICLE AND MANUFACTURE THEREOF

FIELD OF THE INVENTION

The present invention relates to a composite laminated article and to a method of making a composite laminated article. In particular, the present invention relates to composite laminated-articles suitable for use in manufacturing large structures such as, for example, wind turbine blades and boat hulls, decks and bulkheads.

BACKGROUND

Some fibre reinforced composite components comprise an inner rigid foam core sandwiched between outer layers of fibre reinforced composite material. Foam cores are used extensively in the manufacture of fibre reinforced plastic parts to increase the rigidity of the finished article by separating two fibre-reinforced layers, acting as structural skins, with a low-density core material, acting as a structural core. The fibre-reinforced layers are bonded to the low-density core material by a layer of resin material. This construction is commonly called a sandwich panel in the composite industry.

The primary functions of a structural core are to increase panel rigidity, by reducing the overall deflection under load and onset of global panel buckling, and to prevent skin wrinkling and localised buckling.

It is often desired to maximise the mechanical properties of the foam for a given density to enable the lightest weight core to be selected to transfer the structural loads between the fibre reinforced layers. The foam must also be compatible with the materials and manufacturing process used to make structural composite skins.

There is a general need to reduce both construction cost and component weight of composite laminated articles. When a fibre reinforced layer is to be bonded to a core layer it is necessary to provide sufficient resin in the fibre reinforced layer to enable complete bonding to the core layer. There is a need in the art for foam cores that can be securely and reliably bonded to fibre reinforced layers over the interface therebetween that permits a minimum amount of resin to be required for such bonding, in order to minimise the weight and material cost for achieving a given structural performance providing particular mechanical properties.

Furthermore, the size of foam core pieces is limited by both the foam manufacturing process and the handleability of the foam pieces, in order for operators to be able to fit the foam into the mould being used to form the composite component. It is increasingly common for a foam core to be supplied pre-machined to speed up assembly. These foam kits can be made into a jigsaw of foam parts with self assembly features, such as dog bones or serrated edges, to speed up the assembly within the mould and to provide correct positioning of the core into a complex moulding. Depending on the complexity of the core, the machining can lead to considerable amounts of foam material being wasted.

There is a general need to reduce the amount of foam core material being wasted in the manufacture of composite laminated articles.

Low density structural foams (having a density of from 50-600 g/L) currently used in the composite industry that have the highest mechanical and thermal performance are cross-linked polyvinyl chloride (PVC) foam, styrene acrylonitrile (SAN) foam, and polymethacrylimide (PMI) foam. When the outer layers of fibre reinforced composite material are preset as pre-pregs, these foams are suitable for high temperature pre-preg processing at temperatures from 75-160° C., depending on the foam type, in which processing the foam should resist at least 1 bar vacuum pressure for extended periods of time during the pre-preg cure. Other such known foams can be used for lower temperature applications at processing temperatures of from 20-75° C., for example using resin infusion processing, which is known in the art for the manufacture of articles such as boat hulls, decks and bulkheads.

These known foams are made from batch processes and are both time consuming and expensive to produce. These foams have varying degrees of cross-linking making them more difficult to recycle as they cannot be re-melt processed, unlike a true 100% thermoplastic material.

Pre-expanded polystyrene (PS), known in the art as EPS, is commonly used to manufacture low density, low cost foam blocks and moulded parts. It has limited historical use as a structural core in the composite industry, because the polystyrene foam has a low heat resistance and low mechanical properties. Polystyrene cores have been used with epoxy room temperature curing laminating resins but are not suitable for use with polyester and vinyl ester resins, because the styrene used in the resin material attacks and dissolves the polystyrene foam.

The use of EPS for resin infusion and injection processes (VARTM) has not been successful because commercially available EPS grades are relatively porous and the foam absorbs large amounts of resin during the injection process. The resins designed for infusion processes are generally low in viscosity and may contain diluents. In addition, it has been found that some epoxy resins attack and soften EPS during the resin infusion (VARTM) processing. This is due to the combination of the exothermic heat of reaction from the curing epoxy resin, which raises the temperature of the foam, and the low chemical resistance and high porosity of the foam. Usually epoxy resins are selected for demanding applications and a higher performance core is usually preferred to minimise the final component weight.

It is known to add polyphenylene oxide (PPO), also known as polyphenylene ether (PPE), to polystyrene to provide a higher temperature-resistant material with higher mechanical properties. Unusually for thermoplastics, the PPO is miscible and compatible with polystyrene (PS). This compatibility gives the mixed PS/PPO a range of properties, generally the property being related to or proportional to the amount of the material present by a rule of mixtures average of the two polymer properties. The more expensive PPE (PPO) increases the glass transition temperature (Tg), strength and modulus of the blend. This is a key feature as in less compatible polymer blends the material would still show some softening at the temperature of the lowest thermal resistant component. This gives a cost effective higher temperature, tough thermoplastic.

PS/PPO is used for manufacturing some industrial and household plastic goods requiring higher heat resistance. The amount of PPO added is proportional to the improvement in Tg and mechanical properties. The compatibility of PS/PPO is known, and has been marketed commercially, for example by GE Plastics as Noryl®.

PPO/PS is currently commercially available as an unexpanded bead containing a residual amount of a blowing agent, in particular pentane, for producing low density foams (less than 100 g/L) via an expanded polystyrene (EPS) type process. The main use of PPO/PS has been in low density (less than 100 g/L) insulation applications where additional thermal resistance is required such as the first part of the thermal insulation on a hot-water boiler tank. PPO/PS is also used to manufacture high impact performance cycle helmets due to its higher mechanical properties.

EPS/PPO foams are niche products and not well known in the packaging and construction markets. More utilised and marketed are higher impact performance foams such as EPE (Expanded Polyethylene) and EPP (Expanded Polypropylene). These polymers are not ideal for use as a structural core for epoxy composite laminates as they are difficult to bond to, have low modulus and poor thermal resistance showing early softening and creep before their Tg. A useful characteristic of EPS/PPO blends is the retention of modulus close to its Tg value leading to little creep and softening deflection under load.

There is a general need to produce composite laminated articles comprising a foam core having high mechanical properties, and high thermal properties, that can be readily produced at low cost and using conventional composite manufacturing processes.

SUMMARY OF THE INVENTION

According to a first aspect of the present invention, there is provided a composite laminated article comprising: a first layer of a fibre-reinforced resin, a second layer of a closed cell foam of a thermoplastic material, and a third layer of a fibre-reinforced resin, the resin of the first and third layers respectively adhering a surface of the first and third layers to a respective surface of the second layer to form a sandwich construction of the first, second and third layers, wherein the closed cell foam comprises a plurality of expanded beads mutually welded together, each bead comprising a plurality of closed cells, wherein in each bead the closed cell foam has an average cell size of from 15 to 75 microns, at least 50% of the beads comprise first beads having a uniform cell size in which the maximum cell size is 100 microns and at most 50% of the beads comprise second beads having a non-uniform cell size in which the majority of cells have a maximum cell size of 100 microns and a minority of cells have a maximum cell size from more than 100 microns to up to 660 microns.

In this specification, the cell sizes are measured as a cell diameter when viewed as a planar section through the closed cell foam.

Preferably, the closed cell foam comprises at least 66% of the first beads and at most 34% of the second beads.

Preferably, in the second beads the minority of cells have a maximum cell size from more than 100 microns to up to 440 microns.

Typically, the second beads contain an average of less than 5 cells that have a cell size from more than 100 microns to up to 660 microns. More preferably, the second beads contain an average of about 2 cells that have a cell size from more than 100 microns to up to 660 microns.

Preferably, the foam is formed from pre-expanded beads which have an average bead size of from 2 to 4 mm.

Yet more preferably, the number of weld defects, defined as a void between adjacent weld surfaces, is less than 0.25 per bead. In other words, preferably at least at least 75% of the beads are fully welded around their periphery to a plurality of adjacent beads. More preferably, the number of weld defects is less than 0.15 per bead, or in other words, more preferably at least at least 85% of the beads are fully welded around their periphery to a plurality of adjacent beads.

Ideally, the homogeneity of the closed cell foam is such that both the closed cell size distribution and the bead weld uniformity are sufficiently homogeneous that the level of defects, expressed an enlarged cells and/or weld defects, embodied as interbead voids, is very low. This can surprisingly yield not only low resin absorption and good mechanical properties, but also can be achieved using foam densities and bead sizes that are within ranges typically present for foams used to manufacture composite materials.

The present inventors have particularly found that the homogeneity of the closed cell foam, both with respect to the cell size, and with respect to the welding between adjacent bead surfaces, is an important parameter that can achieve not only low resin absorption but also good mechanical properties. In a preferred embodiment, the majority of the cells forming these beads are fine in structure, typically less than 100 microns in diameter and on average 36 microns in diameter. The foam is homogonous with occasional larger cells present within beads. Typically less than half of the beads in a planar section will contain larger cells, but more typically only about one third of the beads in a planar section contain these larger cells. These larger cells are on average 200-440 microns in diameter. On average the beads that contain the larger cells have less than 5, and typically about 2, large cells visible within the bead when viewing a planar section through the foam. The beads are well fused together to minimise the size and number of welding defects between the beads.

Preferably, the closed cell foam has an average cell size of 25 to 50 microns. A particularly preferred foam has an average cell size of about 36 microns.

This aspect of the present invention is also predicated on the finding by the present inventors that closed cell foams can limit the amount of resin that is absorbed by the cells of the foam when a foam body is used as a core layer in a fibre-reinforced composite material. By minimising the amount of resin required to bond the fibre-reinforcement to the foam surface and fill, by absorption into, any open surface cells of the foam surface, the panel weight can be further lowered. This reduction in resin absorption can be achieved even though the closed cell foam can consist of body of expanded beads, each bead including a plurality of closed cells. The bead interfaces can be sufficiently well fused so as not cause significant resin absorption for such a closed cell foam structure. By providing that the closed cells have an average dimension of less than 75 microns the resin absorption can be minimised while ensuring sufficient mutual adhesion between the fibre-reinforced outer layer and the foam core layer to give high mechanical properties for the sandwich composite.

The foam used in accordance with the present invention is compatible with the materials and manufacturing process used to make structural composite skins and has a closed cell construction so as not to absorb excess resin which would otherwise cause an increase in the weight of the final panel.

The closed cell foam may be composed of a blend of polystyrene and polyphenylene oxide (PS/PPO), and the PS/PPO closed cell foam preferably has a density of from 50 to 250 g/liter.

Preferably, the fibre-reinforced resin includes a thermoset resin, such as an epoxy resin.

Suitable epoxy resins include diglycidyl ethers of bisphenol A, diglycidyl ethers of bisphenol F, epoxy novolac resins and N-glycidyl ethers, glycidyl esters, aliphatic and cycloaliphatic glycidyl ethers, glycidyl ethers of aminophenols, glycidyl ethers of any substituted phenols and blends thereof. Also included are modified blends of the aforementioned thermosetting polymers. These polymers can also be modified by rubber or thermoplastic addition or by reactive or non reactive diluents and other modifiers. Reactive diluents such as mono and di-functional glycidyl esters may be used or non reactive diluents such as nonyl phenol, furfural alcohol, and dibutyl phthalatem, polymethyl acetal to lower the viscosity of the resin. Any suitable curing agent or catalyst may be used.

The curing agent or catalyst will be selected to correspond to the resin used. Suitable curing agents are polyamides, polysulfides, mercaptan, aliphatic amines, amidoamines, aromatic amines, anhydride. One suitable latent catalyst for use with an epoxy resin is a dicyandiamide curing agent. The catalyst may be accelerated. Where a dicyandiamide catalyst is used, a substituted urea may be used as an accelerator. Suitable accelerators include Diuron, Monuron, Fenuron, Chlortoluron, bis-urea of toluenedlisocyanate and other substituted homologues. The epoxy curing agent may be selected from Dapsone (DDS), Diamino-diphenyl methane (DDM), BF3-amine complex, substituted imidazoles, accelerated anhydrides, metaphenylene diamine, diaminodiphenylether, aromatic polyetheramines, aliphatic amine adducts, aliphatic amine salts, aromatic amine adducts and aromatic amine salts. Amine and anhydride curing agents are preferred for room temperature low viscosity resin infusible systems and dicyandiamide catalyst and accelerator are preferred for prepreg/SPRINT cure systems requiring an elevated curing temperature.

The resin can be provided with a toughening agent. Suitable toughening agents can be selected from liquid rubber (such as acrylate rubbers, or carboxyl-terminated acrylonitrile rubber), solid rubber (such as solid nitrite rubber, or core-shell rubbers), thermoplastics (such as poly (EtherSuiphone), poly (Imide)), block copolymers (such as styrene-butadiene-methacrylate triblocks), or blends thereof.

The fibrous-reinforcement layer comprises fibrous material such as glass fibre, aramid, carbon fibre, or natural fibres such as hemp, flax, or jute.

According to a second aspect of the present invention there is provided a method of making a composite laminated article, the method comprising the steps of: (a) providing a layer of a closed cell foam of a thermoplastic material, wherein the closed cell foam comprises a plurality of expanded beads mutually welded together, each bead comprising a plurality of closed cells, wherein in each bead the closed cell foam has an average cell size of from 15 to 75 microns, at least 50% of the beads comprise first beads having a uniform cell size in which the maximum cell size is 100 microns and at most 50% of the beads comprise second beads having a non-uniform cell size in which the majority of cells have a maximum cell size of 100 microns and a minority of cells have a maximum cell size from more than 100 microns to up to 660 microns; (b) disposing the layer of closed cell foam between opposed outer layers each including fibre-reinforcment to form a sandwich construction; and (c) adhering an inner surface of each outer layer to a respective adjacent surface of the layer of closed cell foam by a resin, the resin comprising a resin matrix of a fibre-reinforced layer comprising the fibre-reinforcment and the resin matrix.

In one embodiment, in step (c) the resin is infused into the fibre-reinforcement of the second layer and into an interface between the first and second layers. Preferably, the first layer comprises a plurality of channels in the surface of the first layer at the interface between the first and second layers along which channels the infused resin flows in step (c).

In another embodiment, the second layer is a pre-preg and the resin is present in the second layer.

The beads may have an average bead size of from 2 to 4 mm. The closed cell foam is preferably composed of a blend of polystyrene and polyphenylene oxide (PS/PPO), and preferably the PS/PPO closed cell foam has a density of from 50 to 250 g/liter.

According to a third aspect of the present invention there is provided a method of producing a closed cell foam body composed of a blend of polystyrene and polyphenylene oxide (PS/PPO), the method comprising the steps of: (a) providing a plurality of pellets comprising a blend of polystyrene and polyphenylene oxide (PS/PPO) and a blowing agent; (b) expanding the pellets to form a plurality of beads of closed cell foam, wherein the closed cell foam comprises a plurality of expanded beads mutually welded together, each bead comprising a plurality of closed cells, wherein in each bead the closed cell foam has an average cell size of from 15 to 75 microns, at least 50% of the beads comprise first beads having a uniform cell size in which the maximum cell size is 100 microns and at most 50% of the beads comprise second beads having a non-uniform cell size in which the majority of cells have a maximum cell size of 100 microns and a minority of cells have a maximum cell size from more than 100 microns to up to 660 microns, the beads having a first density and containing at least a portion of the blowing agent; and (c) fusing the beads together in pellets in a mould at elevated temperature and elevated pressure to form a closed cell foam moulded body having a second density higher than the first density.

Preferably, the closed cell foam comprises at least 66% of the first beads and at most 34% of the second beads.

Preferably, in the second beads the minority of cells have a maximum cell size from more than 100 microns to up to 440 microns.

Typically, the second beads contain an average of less than 5 cells that have a cell size from more than 100 microns to up to 660 microns. More preferably, the second beads contain an average of about 2 cells that have a cell size from more than 100 microns to up to 660 microns.

More preferably, the pre-expanded beads have an average bead size of from 2 to 4 mm.

Yet more preferably, the number of weld defects, defined as a void between adjacent bead surfaces that are fused or welded together, is less than 0.25 per bead. In other words, preferably at least at least 75% of the beads are fully welded around their periphery to a plurality of adjacent beads. More preferably, the number of weld defects is less than 0.15 per bead, or in other words, more preferably at least at least 85% of the beads are fully welded around their periphery to a plurality of adjacent beads.

Preferably, in step (b) the pellets are expanded in the presence of steam. Preferably, in step (c) the beads are fused together in the presence of steam. Preferably, in step (c) the elevated pressure is from 1 to 5 bar, more preferably from 3 to 5 bar, still more preferably about 5 bar, and/or the elevated temperature is from 150 to 220 degrees Centigrade. Preferably, in the final moulding step (c), residual blowing agent in the beads causes further expansion of the bead and then is released which aids fusion of the beads together to form the final moulded body.

Preferably, the blend of polystyrene and polyphenylene oxide (PS/PPO) comprises from 20 to 70 wt % PPO.

The closed cell foam moulded body preferably has a density of from 50 to 250 g/liter.

In accordance with this aspect of the present invention, it has been found that to produce foams with improved mechanical and thermal properties and at higher densities, the unexpanded pellets of PS/PPO need to be formulated with a level of blowing agent so that the pre-expanded foam beads contain residual blowing agent. Thereafter, in the final moulding step, the residual blowing agent causes further expansion of the bead and then is released which aids fusion of the beads together to form the final moulded body. Preferably, the initial unexpanded pellets of PS/PPO contain interrelated levels of both PPO and blowing agent to achieve the desired level of bead fusion in the final moulding and avoid excessive residual gas within the foam.

As with standard expanded polystyrene foam (EPS) production the unexpanded PS/PPO pellets are expanded using a steam expansion chamber to form pre-expanded PS/PPO beads at a density less than the final desired foam density. The pre-expanded beads of PS and PPO can be moulded and fused into a rigid foam using a steam injection press moulding machine provided that a sufficient level of blowing agent remains within the bead and sufficient heat, pressure and time is allowed in the moulding cycle. Due to the higher thermal resistance of the PS/PPO, this foam is preferably moulded in higher pressure moulding machines (up to 5 bar) such as those commonly used for moulding EPP (Expanded Polypropylene) and EPE (Expanded Polyethylene) foam articles.

When correctly fused this results in a closed cell foam with high heat resistance, fine cell structure and high specific mechanical properties. These EPS/PPO foams then become highly suitable for manufacturing sandwich panels with fibre reinforced epoxy resins.

BRIEF DESCRIPTION OF THE DRAWINGS

Embodiments of the invention will now be described, by way of example only, with reference to the accompanying drawings, in which.

DETAILED DESCRIPTION

Figure 1:
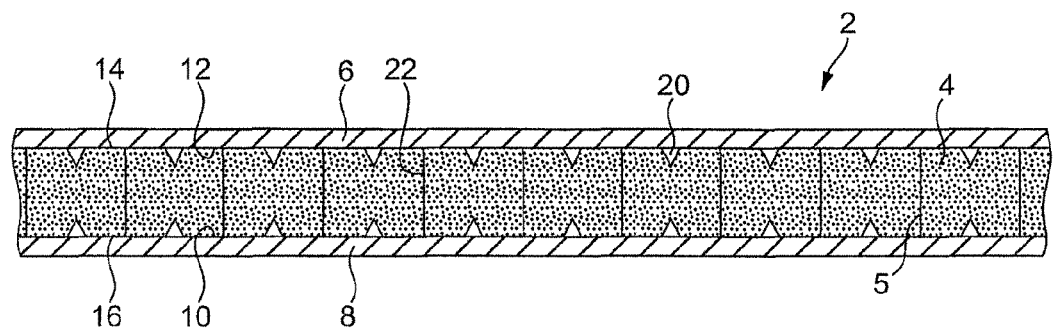
FIG. 1 illustrates a cross-sectional view of a composite laminated article in accordance with an embodiment of the present invention.

Referring to FIG. 1, there is provided a composite laminated article in accordance with a first embodiment of the present invention.

The composite laminated article 2 is a sandwich structure comprising: a central core layer 4 of a closed cell foam 5 of a thermoplastic material, and two outer layers 6, 8 of a fibre-reinforced resin, the resin adhering a respective inner surface 10, 12 of each outer layer 6, 8 to a respective outer surface 14, 16 of the central core layer 4.

Figure 2:
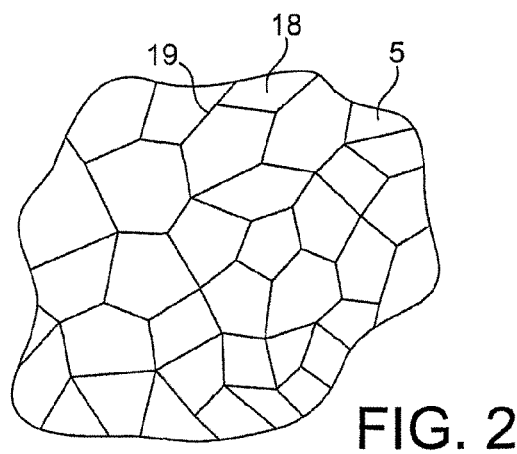
FIG. 2 illustrates an enlarged cross-sectional view the closed cell foam of the composite laminated article of FIG. 1.

Referring to FIG. 2, the closed cell foam 5 comprises a plurality of expanded beads 18 mutually bonded together along bead interfaces 19. Each bead 18 comprises a plurality of closed cells. The closed cell foam 5 has an average cell size of from 15 to 75 microns. Typically less than half of the beads in a planar section contain larger cells. These larger cells are on average 200-440 microns in diameter. On average the beads that contain the larger cells have on average 2 large cells visible within the bead when viewing a planar section through the foam.

The cell and bead size was determined using the cell wall intercept methodology similar to that used in ASTM 112 for determining crystal grain size in crystalline metals. The cell sizes are measured as a cell diameter when viewed as a planar section through the closed cell foam.

The beads have an average bead size of from 2 to 4 mm. The beads are well fused together to minimise the size and number of welding defects between the beads. Such a combination of cell size and bead size can provide the required mechanical properties for the foam.

The central core layer 4 may be provided with a plurality of grooves 20 in one or both of the outer surfaces 14, 16 of the central core layer 4. In addition, one or more conduits 22 may be provided through the thickness of the central core layer 4. Such grooves 20 act as resin flow channels and enable even distribution of resin over the surfaces 14, 16 of the core layer 4 when the resin of the outer layers 6, 8 is introduced into the fibre-reinforcement by a resin infusion process. Correspondingly, the conduits 22 through the central core layer 4 permit substantially equal distribution of resin over the two opposite surfaces of the core layer 4 when the resin of the outer layers 6, 8 is introduced into the fibre-reinforcement by a resin infusion process, because the conduits equalise fluid pressure on the opposite sides of the core layer 4.

Alternatively, when the outer layers 6, 8 are formed from pre-pregs and the resin is present initially in the outer layers 6, 8, the grooves 20 and conduits 22 may be omitted.

In the preferred embodiment, the closed cell foam is composed of a blend of polystyrene and polyphenylene oxide (PS/PPO). The PS/PPO closed cell foam has a density of from 50 to 250 g/liter, more preferably from 50 to 100 g/liter. The blend of polystyrene and polyphenylene oxide (PS/PPO) comprises from 20 to 50 wt % polyphenylene oxide, more preferably from 25 to 35 wt % polyphenylene oxide.

The closed cell foam 5 of PS/PPO may be made by a pre-expanded steam moulding process that is known per se in the art, described hereinbelow.

The closed cell PS/PPO foam used in a composite laminate sandwich panel of an embodiment of the present invention preferably comprises from 20-70% by weight PPO added to PS, and preferably has a density of from 50-250 g/L. A particularly preferred closed cell PS/PPO foam has a density of from 50-160 g/L and comprises from 20-50% by weight PPO in PS. A particular closed cell PS/PPO foam has a density of from 50-100 g/L and comprises from 25-35% by weight PPO in PS.

As a rule, the Tg of a PS/PPO foam tends to increase with increasing PPO content. A typical polystyrene (PS) has a Tg of about 93° C. and for PS/PPO compositions based on that typical PS, the relationship between the PPO content and Tg is typically as follows:

| % PPO | Tg |
|---|---|
| 0 | 93 |
| 10% | 98 |
| 20% | 104 |
| 30% | 110 |
| 40% | 116 |
| 50% | 121 |
| 60% | 127 |
| 70% | 133 |
| 80% | 139 |
| 90% | 144 |

Preferably the PPO content of the PS/PPO foams used in the preferred embodiments of the present invention is controlled to provide a minimum PPO content of 20% to provide the required combination of enhanced mechanical properties and thermal resistance as compared to PS foam.

Preferably the PPO content of the PS/PPO foams used in the preferred embodiments of the present invention is controlled to provide a maximum PPO content of 70% to provide the required combination of enhanced mechanical properties and thermal resistance as compared to PS foam without encountering foam manufacturing problems, in particular difficulty in fusing foams beads together. A more preferred maximum PPO content is 50% which generally provides the required foam properties at reasonable production cost, given that PPO is a more expensive component than PS.

Closed cell PS/PPO foams having a PPO level of typically up to 40% by weight PPO in PS are compatible with fibre-reinforced resin outer layers for which the resin has a curing temperature of 75° C., exemplified by the Applicant's commercially available resins sold as Gurit ST70 and Gurit SE70 for the Gurit SPRINT and pre-preg resin systems, and room curing wet-laminating and infusion resin systems such as Gurit Ampreg and Gurit Prime. "Gurit" and "SPRINT" are registered trade marks.

Closed cell PS/PPO foams having a higher PPO level of typically from 40-70% by weight have a higher thermal resistance and are compatible with fibre-reinforced resin outer layers for which the resin has a curing temperature of 90° C. to 120° C., exemplified by the Applicant's commercially available resins sold as Gurit SE85, Gurit ST95, and Gurit WE90 for prepreg and SPRINT materials. "Gurit" and "SPRINT" are registered trade marks.

The Tg of the foam needs to be higher for higher temperature processing that may be required during manufacture of the composite material, in particular during curing of the resin of the adjacent fibre-reinforced resin composites. The Tg of the foam can be increased by increasing the PPO amount in the foam. The higher Tg and thermal resistance also are useful for infusion processing, since the foam can withstand exothermic temperatures developed by thicker laminates and the mould/cure temperature can be increased to achieve a faster curing cycle.

The PPO also offers increased chemical resistance to the foam. Some diluented epoxy resin infusion systems can attack EPS foam, whereas the EPS/PPO foam tends to be chemically unaffected by exposure to the epoxy resin used in fibre-reinforced composite materials.

However, at particularly high PPO levels, generally 80 wt % PPO or above, it becomes difficult to fuse the pre-expanded beads together in a conventional steam moulding machine. The potential structural properties of the material are not obtained and on increasing the level of PPO further the structural properties plateau and then reduce due to poor levels of fusion between the beads.

In embodiments of the present invention a PS/PPO foam is used within a fibre reinforced epoxy composite structure, typically a sandwich structure, the foam having been made either by direct extrusion or more preferably using a pre-expanded foam and moulding process. The level of PPO has been selected to achieve the required combination of thermal resistance and mechanical properties for the foam. During the manufacture of unexpanded beads of PS/PPO, in order to produce foam by the pre-expanded foam process, sufficient blowing agent is added, and the manufacturing process is controlled, to produce a fully fused foam in order to maximise the material properties of the fused-bead foam. Kitted foam parts may be moulded from pre-expanded beads directly, as opposed to post-machining of the foam to form kitted parts, which can reduce the cost and waste associated with assembling complex, larger composite components.

In accordance with the preferred embodiments, the foam can have a density within the range of from 50-250 g/L at a core thickness of from 3 to 200 mm, although higher thicknesses may be achieved. For lightweight composite parts, the foam core density is more preferably from 50-150 g/L in combination with a 3 to 100 mm core thickness.

In one embodiment, the foam is produced according to the following process.

A molten polymer feedstock is fed into an extruder provided with a gas injection stage to dissolve blowing agent gas, typically pentane, into the melt. The molten polymer exits the extruder die and is chilled, and is then chopped into fine grains to form unexpanded granules. The granules have a texture and size similar to dried sand with a typical diameter of 0.5 to 1.8 mm. The unexpanded granules are then either packaged and sent to a remote site, or moved into a local holding silo. Depending on the polymer, there is a shelf life before the blowing agent (pentane) is lost through diffusion.

In one embodiment, a twin screw extruder is used to disperse and mix together carbon black (as both a foam nucleating agent and a pigment), polyphenylene oxide (PPO) and polystyrene (PS) as a melt at elevated temperature. A typical extrusion temperature is from 220 to 250 degrees Centigrade. A particularly preferred polymer composition comprises 72 wt % polystyrene and 28 wt % polyphenylene oxide. Such a polymer composition is available in commerce under the trade name Noryl® EF from GE Plastics, The Netherlands or under the trade name Suncolor® PPE from Sunpor Kunststoff GmbH, Austria. Then, as blowing agent, 5 wt % pentane is dissolved into the melt. The nucleating agent, in the form of carbon black, is present in a sufficient amount, typically about 0.5 wt %, and in a sufficiently small particle size, to achieve a high level of foam cell nucleation in the subsequent foaming process.

The melt is then cooled and solidified, and chopped to form 0.6 to 1.8 mm diameter granules.

To manufacture pre-expanded foam beads, the unexpanded material is then conveyed to a pre-expansion chamber. Typically the polymer is pre-expanded to achieve a density which is from 5-10 Kg/m3 below the ultimate target density for the foam, this preliminary expansion step using steam injection to soften the polymer to allow the residual blowing gas inside the polymer to expand the granules into low density beads. The majority of the residual blowing agent is removed in this pre-expansion step.

The granules are pre-expanded to form the pre-expanded foam beads using a conventional pre-expansion chamber for forming pre-expanded foam beads. The foam beads are expanded to a density value which is from 5 to 10 g/L below a target density for the ultimate moulded foam product. To achieve a typical density value of about 80 g/L in the final moulded foam, the pre-expansion would typically carried out at a pressure of about 0.25 bar for a period of about 60 seconds, depending on the pre-expander and the final density. Different pre-expander units may require different cycle settings which can be determined by lowering the pressure to increase the pre-expanded density.

The beads are transported and held in holding silos to dry.

Finally, the pre-expanded beads are transported into a final mould and pressurised steam is injected to give final expansion to fill the mould and weld the beads together typically 5 bar, using a conventional press moulding machine for moulding PS/PPE foam products. To maintain a sufficiently blowing agent (pentane) level to fuse the foam beads together, the beads should be used within 4 days of their manufacture. The residence time within the mould may vary from a lower level of about 30 to 60 seconds to a higher level of about 2 to 3 minutes depending on the thickness of the moulded foam product.

The residual blowing agent (pentane) now provides the pressure to give a sufficient fusion weld between the beads. Usually a vacuum cycle is used to remove volatiles and cool the foam. This can either be done in the same mould as the steam injection or the foam can be injected and conveyed to second vacuum cooling mould to speed up the cycle time. After cooling the moulded parts are ejected from the mould and conveyed to a holding zone. An optional heat treatment (typically 2 hrs at 70° C.) may be used to remove any remaining volatiles.

It is known in the art that adding PPO to polystyrene improves the thermal resistance and mechanical properties of the foam. However, if the PPO level is too high then the mechanical performance can be degraded because there is insufficient fusing of the beads together. Conversely, if the PPO level is too low, then the thermal resistance and mechanical performance can be degraded.

To achieve higher mechanical properties and lower resin absorption a homogonous fine cell size is required, as discussed hereinabove. The use of standard nucleating agents and pigments such as carbon black can assist the desired cell formation.

The pre-expanded foam moulding process provides the ability to mould foam shapes and moulded blocks directly to a desired foam thickness. In this process, the final foam Tg and PPO levels are limited by the ability to fuse the pre-expanded beads together.

The PS/PPO foam of the present invention is suitable for all fibre reinforced epoxy manufacturing methods, for example, open moulding, VARTM (Vacuum Assisted Resin Transfer Moulding), RTM (Resin Transfer Moulding), pre-preg moulding and moulding using the Applicant's SPRINT resin-impregnated composite materials.

The PS/PPO foam having a density of from 50-100 g/L may be used for in accordance with the present invention for manufacturing composite parts made with low temperature, less than 75° C., curing fibre reinforced epoxy pre-preg and SPRINT composite materials.

The present invention enables the use of unexpanded PS/PPO beads to be used to manufacture foams at higher densities so as to be suitable for composite parts made with such low temperature curing fibre reinforced epoxy pre-preg and SPRINT composite materials. By modifying the level of pentane, or other blowing agent, in the unexpanded PS/PPO pellets, this can make the PS/PPO more suitable for higher density foam production, having a density of from 100 g/L to 250 g/L, with high mechanical and thermal properties. Further, by modifying the level of PPO, this can increase the thermal resistance of the foam to make it more suitable to use with high temperature curing fibre reinforced epoxy pre-preg and SPRINT composite materials, having curing temperatures of from typically 75° C. to 120° C.

The preferred embodiments of the present invention provide a number of advantages over known foam-core composites and manufacturing processes therefor.

By directly moulding a foam core, this can reduce the cost to manufacture a structural foam by achieving lower material waste and a simplified manufacturing process. The foam can provide high mechanical properties at a given foam density. The preferred PS/PPO foams are highly compatible with epoxy resins that are used in fibre-reinforced composite materials. The preferred PS/PPO foams can provide sufficient heat stability and creep resistance to enable high temperature pre-preg materials to be cured while in contact with the foam without encountering foam collapse during processing, and after manufacture if the composite is exposed to high in-service temperatures. The preferred PS/PPO foams provide sufficient heat stability and creep resistance for the foam to be able to withstand the exothermic temperatures generated when curing thicker laminates made using open moulding, VARTM (Vacuum Assisted Resin Transfer Moulding), and RTM (Resin Transfer Moulding) processes. The preferred PS/PPO foams can also provide sufficient heat stability for the foam to enable higher cure temperatures to be used to cure parts manufactured from open moulding, VARTM (Vacuum Assisted Resin Transfer), RTM processes more quickly. The preferred PS/PPO foams provide a foam that is recyclable as it is 100% thermoplastic.

The provision of a closed cell foam having a small cell size can reduce the amount of resin absorbed by the core during processing, which can enable less overall resin to be used in the sandwich production process. This can save material cost and reduce the final component weight.

By directly moulding a foam core, thicker foam sections with uniform density can be produced. This can avoid the need to adhere separate sheets of thinner foam together for thicker sandwich panel laminates. For example, some known foams for use in composite materials have a maximum thickness of about 50 mm, whereas the preferred PS/PPO foams may be significantly thicker, for example up to at least 200 mm. When using known foams, it has been found that significant weight is added to bond together the thinner foam sheets using additional resin layers. For example, typically at least a 400 g/m² epoxy resin adhesive resin film is used to bond two sheets of known Corecell® SAN foam together to form a thicker foam core.

When the preferred PS/PPO foams are produced using unexpanded beads which are then expanded directly into moulds having the desired shape and dimensions, this can provide the further advantage of savings in transportation costs and plant expansion costs. The high density unexpanded PS/PPO beads can be supplied to existing foam moulders to produce foam at geographical locations closer to large composite component manufacturers. This can reduce the capital investment to set-up new foam production and reduces the cost of transporting foam globally.

The preferred embodiments of the present invention can provide a number of advantages over known composite foam sandwich structures. First, this can provided reduced process and material costs. Second, high structural properties can be achieved. Third, lower resin absorption can be achieved, which can reduce overall component weight and cost. Accordingly, while the structural properties of the foam itself may not be as high as some PVC foam used as a core layer in composites, since the amount of resin required to be used to bond the foam core is reduced, the mechanical properties vs density can then exceed market leading PVC foams, and this can be a major technical benefit, as well as the core itself being cheaper to manufacture. Fourth, transportation and plant expansion cost savings can be achieved. The high density unexpanded beads can be supplied to existing foam moulders to produce foam at geographical locations closer to large composite component manufacturers. This reduces the capital investment to set-up new foam production and reduces the cost of transporting foam globally.

The present invention will now be described further with reference to the following non-limiting examples.

Example 1

A 110° C. Tg PS/PPO blend, having a PPO content of from 25 to 35 wt %, with a pentane blowing agent content of 5 wt % was provided as pellets. The pellets were pre-expanded using a steam injection process to form beads 2-4 mm in diameter. The beads where then moulded into a rigid closed cell foam at 5 bar to give a 69 g/L foam with an average bead diameter of 3.2 mm. The pre-expansion and moulding process produced homogeneous foam with the majority of beads being formed of fine closed cells that were 36 microns in diameter. When a section through the foam was observed 66% of the beads were formed from only fine cells. The remaining 34% of the beads, on average, contained only 2 larger cells with an average diameter of 0.26 mm. The number and size of cavities between the beads was such that 1 small welding void was formed for every 9 beads. A high level of fusion between the beads had occurred as when attempting to separate individual beads failure occurred within the beads and not just in the weld zones.

Figure 3:
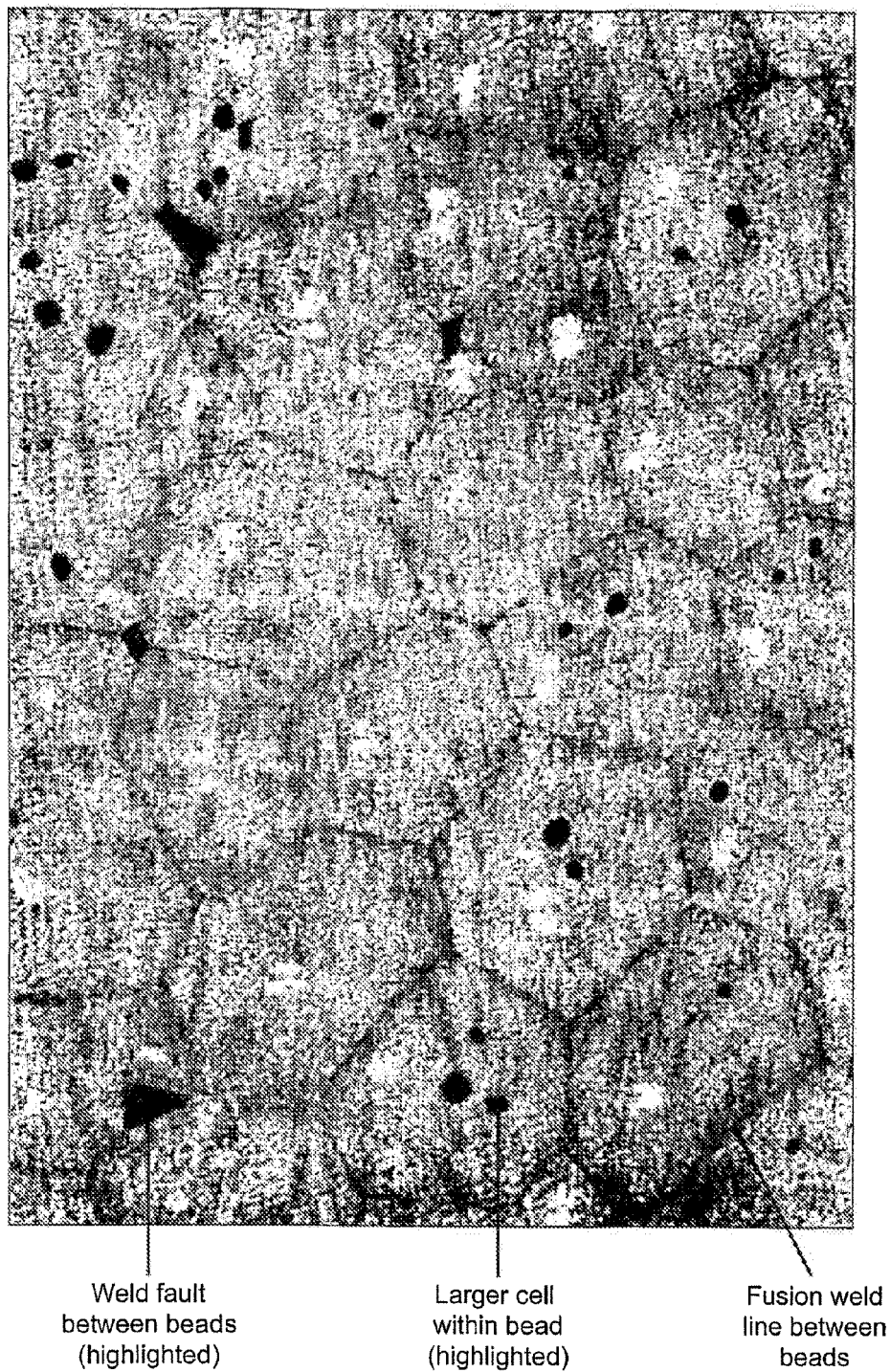
FIG. 3 is a micrograph of a closed cell foam produced in accordance with an Example of the present invention.
Figure 4:
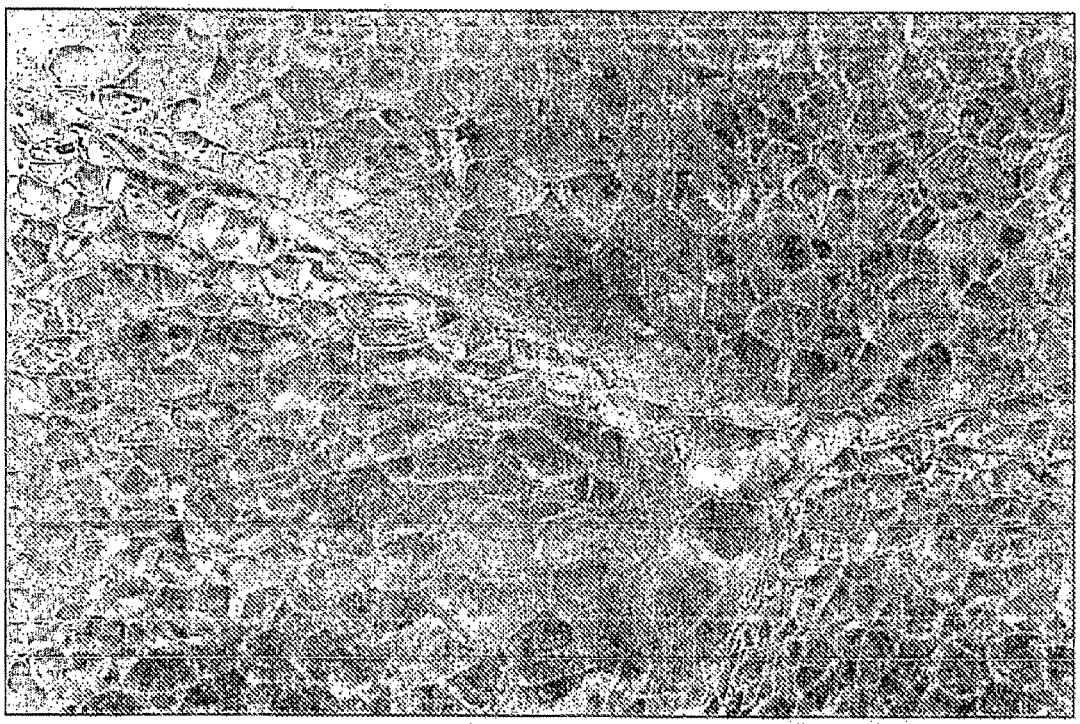
FIG. 4 is a scanning electron micrograph of the closed cell foam of FIG. 3.

FIG. 3 is a micrograph of the resultant foam structure. The foam is composed of beads mutually fused together along weld lines between the beads (which were on average 3.2 mm in size (which may be expressed as a diameter). It may be seen that there are only a few weld faults between the beads, which are highlighted in the micrograph. Also, within the beads there are only a few enlarged cells. The enlarged cells are highlighted in the micrograph, and are significantly larger than the fine closed cells that have a size that is too small to be distinguishable in the micrograph and would require analysis using a scanning electron microscope to resolve the cell detail. FIG. 4 is a scanning electron micrograph of the closed cell foam of FIG. 3. The fine cells and the beads, and the weld lines between the beads, can be seen.

When compared to a styrene acrylonitrile (SAN) foam, commercially available under the trade name of T-grade Corecell, and well known for use as a core layer in composite material, at the equivalent density this foam had superior mechanical properties;

| Shear strength/Mpa | BS ISO 1922:2001 | +11% |
| Shear modulus/Mpa | BS ISO 1922:2001 | +10% |
| Compressive strength/Mpa | ISO844 | +19% |

This foam was then employed as a core foam layer in a sandwich composite between opposite outer fibre-reinforced composite layers and infused with Gurit epoxy Prime 20LV plus slow hardener using a VARTM process. The epoxy resin amount absorbed by the exposed surface cavities in the core and to bond the outer fibre-reinforced composite layers securely to the inner central core layer was about 120 g/m2 for each face of the central core layer.

The foam detailed in this Example can be pre-made to the required dimensions, thereby minimising weight, material waste, and avoiding the need for additional bonding steps.

Comparative Example 1

A styrene acrylonitrile (SAN) foam, commercially available under the trade name of Corecell and well known for use as a core layer in composite material, having an average cell size of about 0.6 mm was employed as a core foam layer in a sandwich composite between the same opposite outer fibre-reinforced composite layers including epoxy resin as were used in Example 1.

Figure 5:
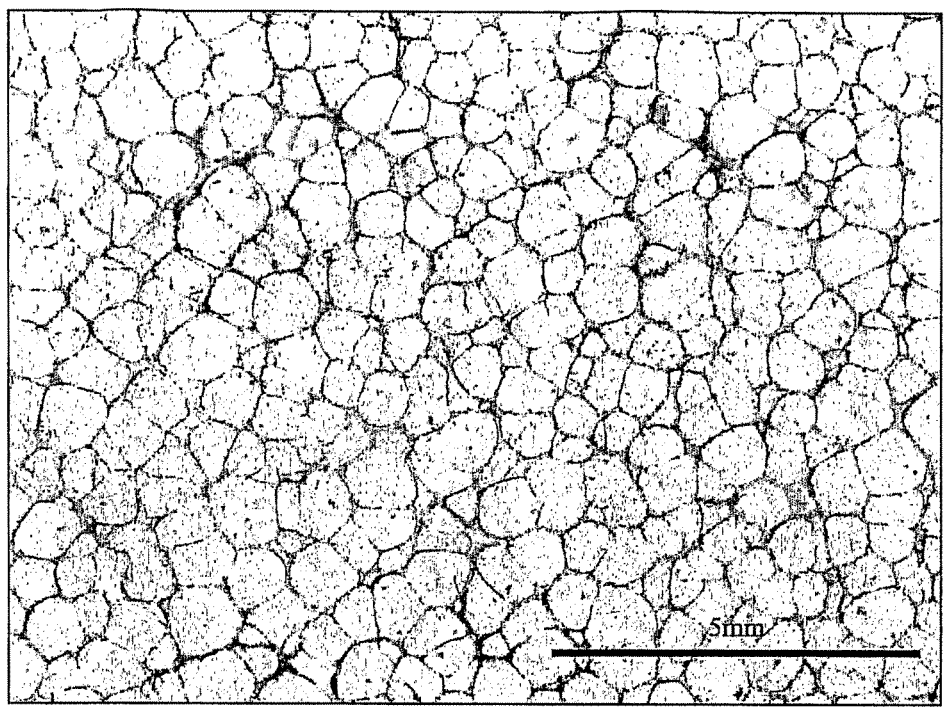
FIG. 5 is a micrograph of a known foam used in composite laminates.
Figure 6:
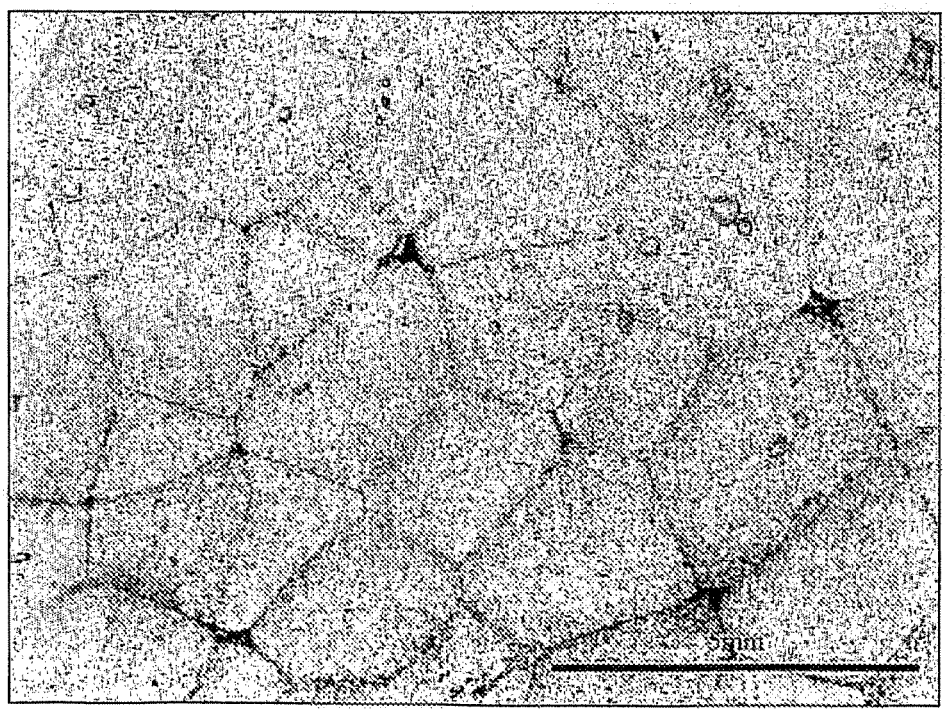
FIG. 6 is a micrograph of a closed cell foam produced in accordance with an Example of the present invention.

FIG. 5 is a micrograph of the foam structure. The foam is composed of relatively large cells mutually abutting together along cell boundaries. In contrast, FIG. 6 is a micrograph of the foam structure of Example 1 to the same scale, where the cells are too small to be seen but the mutually fused beads can be seen.

The epoxy resin amount absorbed by the core and to bond the outer fibre-reinforced composite layers securely to the inner central core layer was about 500 g/m2 for each face of the central core layer.

The reduced resin absorption achieved by Example 1 as compared to Comparative Example 1 is a significant technical advantage. To give the same overall panel weight as the foam in Example 1 for a 25 mm core thickness a lighter 54 g/L Corecell T grade foam would need to be used. In this case the foam of Example 1 would have a 59% increase in shear strength for the same overall panel weight.

The effect is more significant at thinner core thickness. With a 10 mm core thickness a 31 g/L Corecell T grade foam would be required for the same overall panel weight and then the foam in Example 1 would have a 250% increase in shear strength.

At 50 mm core thickness a 61 g/L Corecell foam would be required for the same equivalent weight and then the foam in Example 1 would have over 32% increase in shear strength.

Comparative Example 2

A 100% PS foam with a pentane blowing agent content of 5 wt % was provided as pellets. The pellets were pre-expanded using a steam injection process. The beads where then moulded into a rigid closed cell foam at 1.2 bar to give a 50 g/L foam with an average bead diameter of 3.8 mm. The beads lacked the finer cells and the majority of the cells forming the beads having an average diameter of 0.24 mm. The moulding process did not produce a fully homogonous foam with voids formed at bead intersections where the beads had not expanded sufficiently to all the cavities such that at least 90% of all beads had a small welding void.

Figure 7:
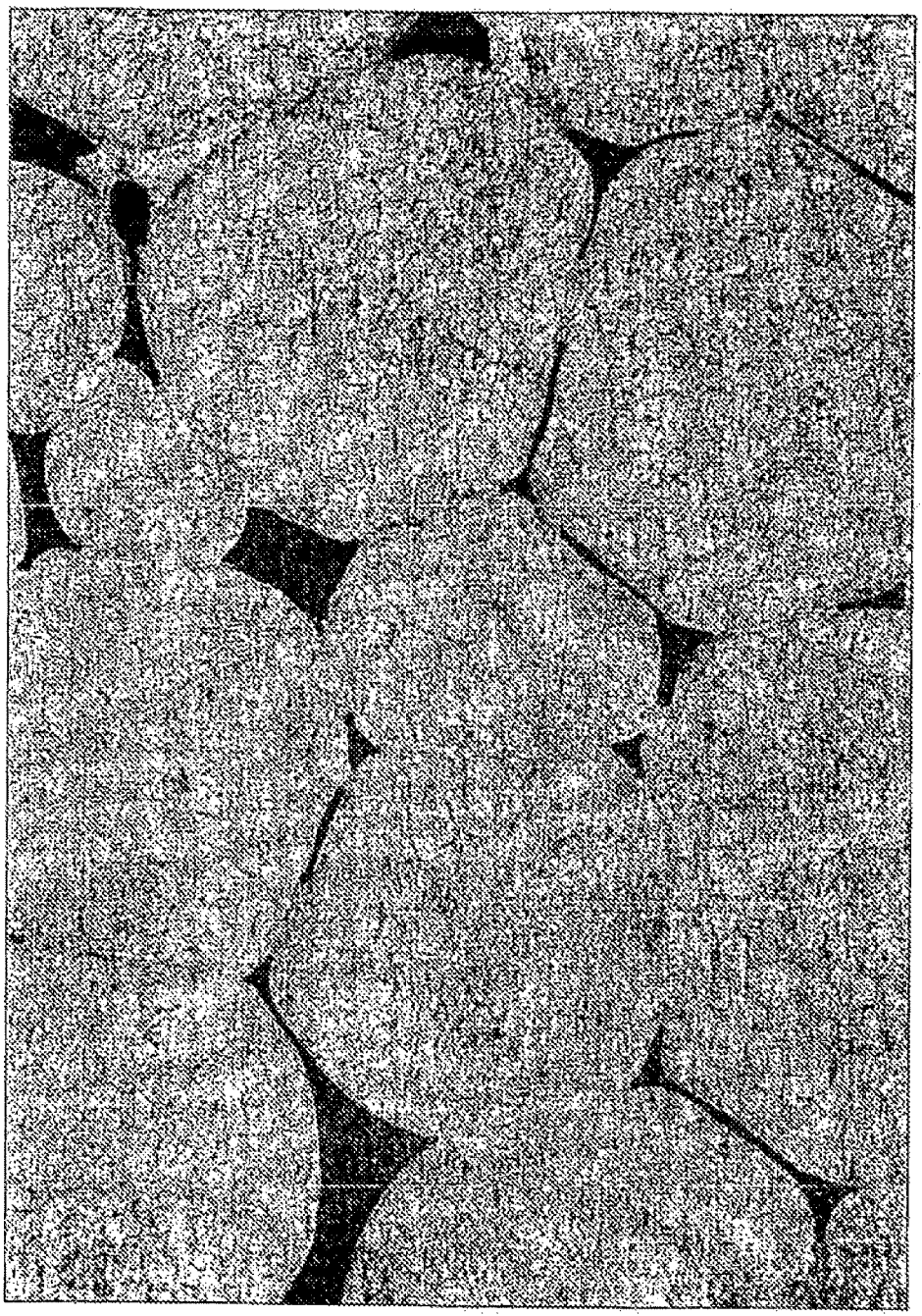
FIG. 7 is a micrograph of a foam produced in accordance with a Comparative Example.

FIG. 7 is a micrograph of the resultant foam structure. The foam is composed of beads mutually fused together along weld lines between the beads (which were on average 3.8 mm in size (which may be expressed as a diameter). It may be seen that there is a high number of weld faults between the beads, which are highlighted in the micrograph. The weld faults appeared as cracks and voids between the beads, and the voids had a typical size of 0.9 mm. The walls of the beads appear substantially solid and independent, with poor interbead fusion. Also, within the beads there are only a relatively large cells, having an average size (which may be expressed as a diameter) of 0.24 mm. The enlarged cells are highlighted in the micrograph, and are significantly larger than the fine closed cells that have a size that is too small to be distinguishable in the micrograph. The cell structure is consistently formed of such large cells, as compared to the foam of Example 1 which consists of a large number of significantly finer cells, about an order of magnitude smaller, with only a few larger cells existing as cell defects.

This foam was employed as a core foam layer in a sandwich composite between opposite outer fibre-reinforced composite layers including epoxy resin. The epoxy resin amount absorbed by the core and to bond the outer fibre-reinforced composite layers securely to the inner central core layer was about 680 g/m2 for each face of the central core layer due to the presence of the larger cells and welding defects. Some softening was observed due to the lower thermal and chemical resistance of the foam.

Comparative Example 3

A 115° C. Tg PS/PPO closed cell foam, having a PPO content of from 35 to 45 wt %, was first pre-expanded and then moulded into a rigid foam at 1.2 bar to give a 100 g/L foam with an average bead diameter of 2.7 mm. The moulding process did not produce a fully homogonous foam. The beads were formed as a mixture of fine closed cells that were less than 0.1 mm in size and a number of larger cells. Each bead on average contained five or more of these larger cells with an average cell size of 0.42 mm. Voids were formed at bead intersections where the beads had not expanded sufficiently to all the cavities such that at least 50% of beads had a small welding void. Individual beads could be separated at the bead interfaces and the foam had not achieved optimum fusion levels.

Figure 8:
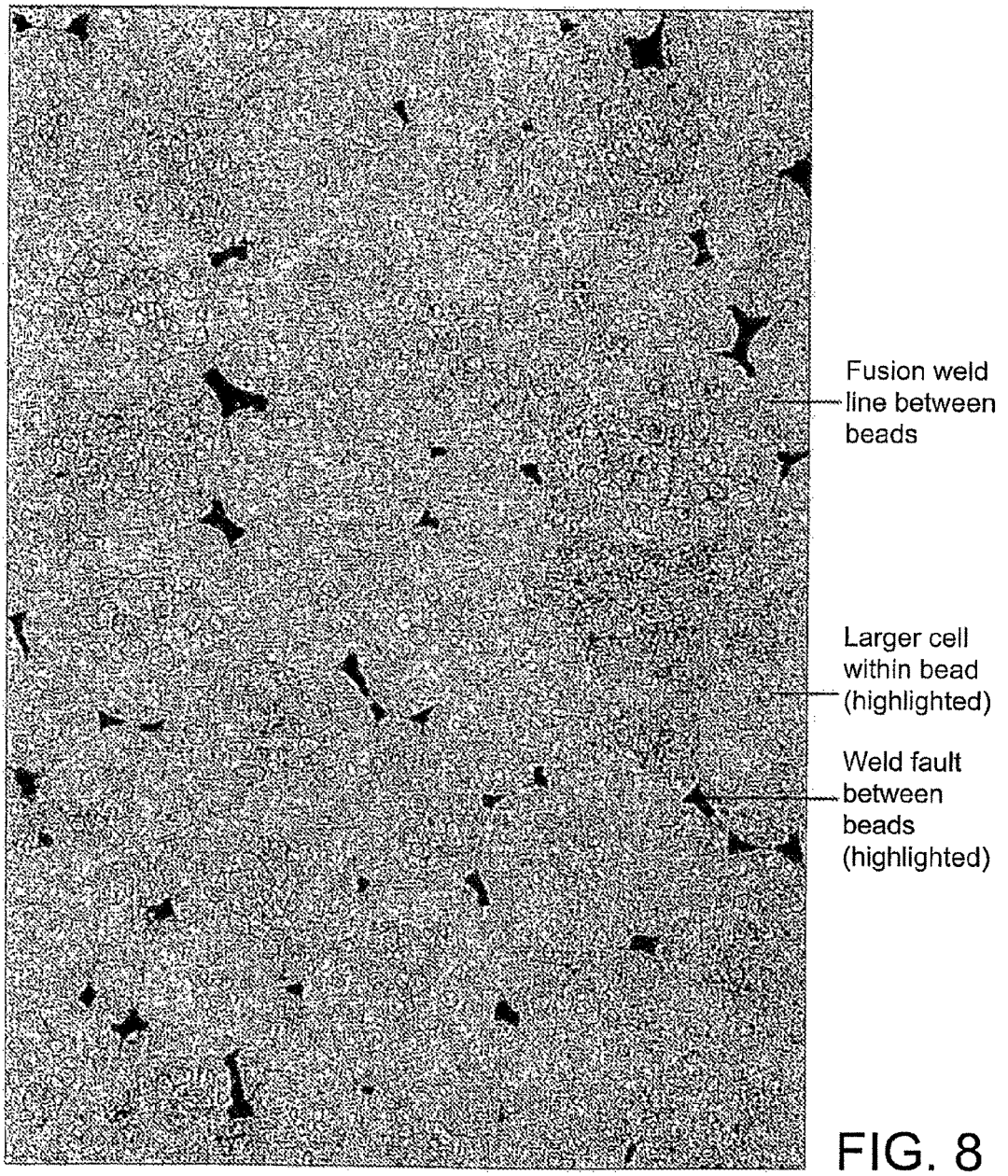
FIG. 8 is a micrograph of a foam produced in accordance with another Comparative Example.

The microstructure is shown in FIG. 8, which can be compared to FIG. 3 for Example 1. Many of the beads had enlarged cells therein, and there were many weld faults between the beads.

The average measured mechanical properties of the foam compared to a styrene acrylonitrile (SAN) foam, commercially available under the trade name of T-grade Corecell, and well known for use as a core layer in composite material were significantly lower at the equivalent density.

| Shear strength/Mpa | BS ISO 1922:2001 | −31% |
| Shear modulus/Mpa | BS ISO 1922:2001 | −16% |
| Compressive strength/Mpa | ISO844 | −26% |

Comparative Example 4

A 115° C. Tg PS/PPO closed cell foam, having a PPO content of from 35 to 45 wt %, was first pre-expanded and then moulded into a rigid foam at 3 bar to give a 100 g/L foam with an average bead diameter of 2.8 mm. The beads lacked the finer cells and the majority of the cells forming the beads having an average diameter of 0.28 mm. The moulding process did not produce a fully homogonous foam with voids formed at bead intersections where the beads had not expanded sufficiently to all the cavities such that at least 50% of all beads had a small welding void although the size of these voids were reduced by the increased moulding pressure. Individual beads could still be separated at the bead interfaces and although the fusion level was higher than the foam of Comparative Example 3, the foam had not achieved optimum fusion levels The average measured mechanical properties of the foam compared to a styrene acrylonitrile (SAN) foam, commercially available under the trade name of T-grade Corecell, and well known for use as a core layer in composite material were significantly lower at the equivalent density.

| Shear strength/Mpa | BS ISO 1922:2001 | −46% |
| Shear modulus/Mpa | BS ISO 1922:2001 | −48% |
| Compressive strength/Mpa | ISO844 | −50% |

Although the level of weld fusion was higher in the foam of Comparative Example 3, the mechanical performance had reduced due to the increase in the number of larger cells.

This foam was employed as a core foam layer in a sandwich composite between opposite outer fibre-reinforced composite layers including epoxy resin. The epoxy resin amount absorbed by the core and to bond the outer fibre-reinforced composite layers securely to the inner central core layer was about 950 g/m2 for each face of the central core layer due to the presence of the larger cells and welding defects.

Comparative Example 5

The level of PPO in the foam described in Comparative Example 4 was increased to a value within the range of 55 to 65 wt % to give a 125° C. Tg PS/PPO closed cell foam which was first pre-expanded and then moulded into a rigid foam at 3.0 bar to give a 100 g/L foam with an average bead diameter of 2.8 mm. The beads lacked the finer cells and the majority of the cells forming the beads had an average diameter of 0.28 mm. The moulding process did not produce a fully homogonous foam with voids formed at bead intersections where the beads had not expanded sufficiently to all the cavities such that 64% of all beads had a welding void. The cell structure and number of weld defects were approximately the same as the foam described in Comparative Example 4.

This core was employed as a core foam layer in a sandwich composite between opposite outer fibre-reinforced composite layers including epoxy resin. The epoxy resin amount absorbed by the core and to bond the outer fibre-reinforced composite layers securely to the inner central core layer was about 685 g/m2 per face of the central core layer for each face of the central core layer.

When compared to a styrene acrylonitrile (SAN) foam, commercially available under the trade name of T-grade Corecell, and well known for use as a core layer in composite material at the equivalent density were significantly reduced by the presence of the larger cells and weld defects.

| Shear strength/Mpa | BS ISO 1922:2001 | −41% |
| Shear modulus/Mpa | BS ISO 1922:2001 | −46% |
| Compressive strength/Mpa | ISO844 | −37% |

When compared to the foam described in Comparative Example 4 the mechanical properties have increased with increasing the PPO level but not as significantly as improving the cell structure and reducing the number of weld defects as described in Example 1.

Comparative Example 6

The level of PPO in the foam described in Comparative Example 3 was increased to a value within the range of 75 to 85 wt % to give a 140° C. Tg PS/PPO closed cell foam. This was first pre-expanded and then moulded into a rigid foam at 3.0 bar to give a 100 g/L foam with an average bead diameter of 3.2 mm. The beads being formed as a mixture of fine closed cells that were less than 0.1 mm in size and a high number of larger cells with an average diameter cell of 0.32 mm.

When compared to a styrene acrylonitrile (SAN) foam, commercially available under the trade name of T-grade Corecell, and well known for use as a core layer in composite material, at the equivalent density the values were significantly reduced by the presence of the larger cells and weld defects.

| Shear strength/Mpa | BS ISO 1922:2001 | −36% |
| Shear modulus/Mpa | BS ISO 1922:2001 | −36% |
| Compressive strength/Mpa | ISO844 | −36% |

When compared to the foam described in Comparative Example 4 and Comparative Example 5 the mechanical properties have increased with increasing the PPO level but not as significantly as improving the cell structure and reducing the number of weld defects as described in Example 1.

Comparative Example 7

A 100% PS foam with a pentane blowing agent content of 5 wt % was provided as pellets. The pellets were pre-expanded using a steam injection process. The beads where then moulded into a rigid closed cell foam at 1.2 bar to give a 50 g/L foam with an average bead diameter of 3.8 mm. The beads lacked the finer cells and the majority of the cells forming the beads had an average diameter of 0.24 mm. The moulding process did not produce a fully homogonous foam with voids formed at bead intersections where the beads had not expanded sufficiently to all the cavities such that at least 50% of all beads had a small welding void.

This foam was employed as a core foam layer in a sandwich composite between opposite outer fibre-reinforced composite layers including epoxy resin. The epoxy resin amount absorbed by the core and to bond the outer fibre-reinforced composite layers securely to the inner central core layer was about 680 g/m2 for each face of the central core layer due to the presence of the larger cells and welding defects. Some softening was observed due to the lower thermal and chemical resistance of the foam.

Comparative Example 8

A 150 mm thick Corecell T-400 (70 g/L) styrene acrylonitrile (SAN) foam was required to form a composite panel. The maximum commercially available sheet thickness, available from the Applicant Gurit, was 38 mm. Accordingly, four foam sheets were stacked together and adhered by epoxy resin interlayers. Three 400 g/m2 epoxy resin adhesive films were used to pre-join the four sheets of the core and then the stack was sanded back to achieve the desired thickness for the composite panel of 150 mm. This increased the final core weight by 10% to 77 g/L, as compared to a single 150 mm thick sheet, but without an increase in shear strength. Shear elongation was reduced.

Example 2

The foam produced in Example 1 was then employed as a core foam layer in a sandwich composite between opposite outer fibre-reinforced composite layers made from a glass fibre pre-preg material (in particular a pre-preg sold by Gurit under the trade name SPRINT comprising ST70 epoxy resin and glass fibre). The pre-preg material of the sandwich was cured using vacuum bag processing using the following cure cycle—heat from room temperature at a rate of 0.5 degC/min to 60 degC, maintain at that temperature for a dwell period of 2 hours, heat at a rate of 0.3 degC/min to a temperature of 75 degC, maintain at that temperature for a dwell period of 16 hours.

No additional adhesive film or any increase in the SPRINT pre-preg resin content was required in the pre-preg material to bond the outer fibre-reinforced composite layers to the foam core. On curing the laminate, sufficient resin remained in the fibre reinforced laminate portions.

Comparative Example 9

The styrene acrylonitrile (SAN) foam described in Comparative Example 1 was employed to make a sandwich similar to that of Example 2, using the same Gurit epoxy ST70 glass fibre SPRINT pre-preg material, but with a different foam core.

Resin was absorbed by the foam core leading to insufficient resin remaining in the fibre reinforced laminate portions.

To give acceptable resin levels in the fibre reinforced laminate portions a 250 g/m2 Gurit SA70 epoxy resin adhesive film was first applied to each side of the core material to maintain an adequate bond to the outer fibre-reinforced composite layers and prevent the core removing excess resin from the Gurit epoxy ST70 glass fibre SPRINT pre-preg layers.

The invention claimed is:

1. A composite laminated article comprising: a first layer of a fibre-reinforced resin, a second layer of a closed cell foam of a thermoplastic material, wherein the thermoplastic material is composed of a blend of polystyrene and polyphenylene oxide (PS/PPO), and a third layer of a fibre-reinforced resin, the resin of the first and third layers respectively adhering a surface of the first and third layers to a respective surface of the second layer to form a sandwich construction of the first, second and third layers, wherein the closed cell foam comprises a plurality of expanded beads mutually welded together, each bead comprising a plurality of closed cells, wherein in each bead the closed cell foam has an average cell size of from 15 to 75 microns, at least 50% of the beads comprise first beads having a uniform cell size in which the maximum cell size is 100 microns and at most 50% of the beads comprise second beads having a non-uniform cell size in which the majority of cells have a maximum cell size of 100 microns and a minority of cells have a maximum cell size from more than 100 microns to up to 660 microns.

2. A composite laminated article as claimed in claim 1 wherein the closed cell foam comprises at least 66% of the first beads and at most 34% of the second beads.

3. A composite laminated article as claimed in claim 1 wherein in the second beads the minority of cells have a maximum cell size from more than 100 microns to up to 440 microns.

4. A composite laminated article as claimed in claim 1 wherein the second beads contain an average of less than 5 cells that have a cell size from more than 100 microns to up to 660 microns.

5. A composite laminated article as claimed in claim 1 wherein the pre-expanded beads have an average bead size of from 2 to 4 mm.

6. A composite laminated article as claimed in claim 1 wherein the number of weld defects, defined as a void between adjacent weld surfaces, is less than 0.25 per bead.

7. A composite laminated article as claimed in claim 6 wherein the number of weld defects is less than 0.15 per bead.

8. A composite laminated article as claimed in claim 6 wherein the number of weld defects is less than 0.15 per bead.

9. A composite laminated article as claimed in claim 1 wherein the PS/PPO closed cell foam has a density of from 50 to 250 g/liter.

10. A composite laminated article as claimed in claim 1 wherein the fibre-reinforced resin includes epoxy resin.

11. A composite laminated article as claimed in claim 1 wherein the second beads contain an average of about 2 cells that have a cell size from more than 100 microns to up to 660 microns.

12. A method of making a composite laminated article, the method comprising the steps of: (a) providing an inner layer of a closed cell foam of a thermoplastic material, wherein the thermoplastic material is composed of a blend of polystyrene and polyphenylene oxide (PS/PPO), wherein the closed cell foam comprises a plurality of expanded beads mutually welded together, each bead comprising a plurality of closed cells, wherein in each bead the closed cell foam has an average cell size of from 15 to 75 microns, at least 50% of the beads comprise first beads having a uniform cell size in which the maximum cell size is 100 microns and at most 50% of the beads comprise second beads having a non-uniform cell size in which the majority of cells have a maximum cell size of 100 microns and a minority of cells have a maximum cell size from more than 100 microns to up to 660 microns; (b) disposing the layer of closed cell foam between opposed outer layers each including fibre-reinforcement to form a sandwich construction; and (c) adhering an inner surface of each outer layer to a respective adjacent surface of the layer of closed cell foam by a resin, the resin comprising a resin matrix of a fibre-reinforced layer comprising the fibre-reinforcement and the resin matrix.

13. A method as claimed in claim 12 wherein in step (c) the resin is infused into the fibre-reinforcement of the outer layer and into an interface between the inner and outer layers.

14. A method as claimed in claim 13 wherein the inner layer comprises a plurality of channels in the surface of the inner layer at the interface between the inner and outer layers along which channels the infused resin flows in step (c).

15. A method as claimed in claim 12 wherein the second layer is a pre-preg and the resin is present in the outer layer.

16. A method as claimed in claim 12 wherein the closed cell foam comprises at least 66% of the first beads and at most 34% of the second beads.

17. A method as claimed in claim 16 wherein in the second beads the minority of cells have a maximum cell size from more than 100 microns to up to 440 microns.

18. A method as claimed in claim 12 wherein the second beads contain an average of less than 5 cells that have a cell size from more than 100 microns to up to 660 microns.

19. A method as claimed in claim 12 wherein the pre-expanded beads have an average bead size of from 2 to 4 mm.

20. A method as claimed in claims 12 wherein the number of weld defects, defined as a void between adjacent weld surfaces, is less than 0.25 per bead.

21. A method as claimed in claim 12 wherein the PS/PPO closed cell foam has a density of from 50 to 250 g/liter.

22. A method as claimed in claim 12 wherein the fibre-reinforced resin includes epoxy resin.

* * * * *

UNITED STATES PATENT AND TRADEMARK OFFICE
CERTIFICATE OF CORRECTION

PATENT NO. : 8,465,832 B2
APPLICATION NO. : 12/681570
DATED : June 18, 2013
INVENTOR(S) : Jones It is certified that error appears in the above-identified patent and that said Letters Patent is hereby corrected as shown below:

In the Claims

In column 18, line 49 (claim 7) "6" should be -- 1 --.

In column 19, line 9 (claim 12) after "the" insert -- inner --.

In column 20, line 1 (claim 15) "second" should be -- outer --.

In column 20, line 15 (claim 20) "claims" should be -- claim --.

Signed and Sealed this
Sixth Day of August, 2013

Teresa Stanek Rea
*Acting Director of the United States Patent and Trademark Office*

UNITED STATES PATENT AND TRADEMARK OFFICE
CERTIFICATE OF CORRECTION

PATENT NO. : 8,465,832 B2  Page 1 of 1
APPLICATION NO. : 12/681570
DATED : June 18, 2013
INVENTOR(S) : Daniel Thomas Jones It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 234 days.

Signed and Sealed this

Eighth Day of September, 2015

Michelle K. Lee
*Director of the United States Patent and Trademark Office*